US011792071B1

(12) United States Patent
Nadeem et al.

(10) Patent No.: US 11,792,071 B1
(45) Date of Patent: Oct. 17, 2023

(54) INTENT-BASED USER AUTHENTICATION FOR DYNAMIC APPLICATIONS

(71) Applicant: Juniper Networks, Inc., Sunnyvale, CA (US)

(72) Inventors: Fnu Nadeem, Fremont, CA (US); Adithya Shasa Sai Seerapu, Visakhapatnam (IN); Vinaya Kumar Kathireddy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/645,011

(22) Filed: Dec. 17, 2021

(51) Int. Cl.
| *H04L 41/0816* | (2022.01) |
| *H04L 9/40* | (2022.01) |
| *H04L 41/08* | (2022.01) |
| *G06F 16/13* | (2019.01) |
| *H04L 65/1104* | (2022.01) |
| *G06F 16/22* | (2019.01) |

(52) U.S. Cl.
CPC ......... *H04L 41/0816* (2013.01); *G06F 16/13* (2019.01); *G06F 16/2246* (2019.01); *H04L 41/0883* (2013.01); *H04L 63/102* (2013.01); *H04L 63/20* (2013.01); *H04L 65/1104* (2022.05)

(58) Field of Classification Search
CPC .......... G06F 16/13; G06F 16/93; G06F 11/26
See application file for complete search history.

(56) References Cited

U.S. PATENT DOCUMENTS

| 8,650,159 B1 | 2/2014 | Zhang et al. |
| 10,728,145 B2 | 7/2020 | Rao et al. |
| 11,443,102 B1* | 9/2022 | Wilson ................... G06F 3/0482 |
| 2006/0031536 A1* | 2/2006 | Eydelman ........... H04L 65/1104 709/228 |
| 2014/0033271 A1* | 1/2014 | Barton .................. H04W 12/64 726/1 |
| 2021/0064771 A1* | 3/2021 | Julaih .................... G06F 21/121 |
| 2021/0311792 A1* | 10/2021 | Rosoff .................. G06F 9/5027 |
| 2021/0397729 A1* | 12/2021 | McQuaid ................ G06F 16/13 |

(Continued)

OTHER PUBLICATIONS

U.S. Appl. No. 17/491,224, filed Sep. 30, 2021, naming inventors Mariappan et al.

(Continued)

*Primary Examiner* — Barbara B Anyan
(74) *Attorney, Agent, or Firm* — Shumaker & Sieffert, P.A.

(57) ABSTRACT

An example computing system includes one or more processing units implemented in circuitry and configured to: process an intent for configuration of a plurality of managed network devices, the intent representing authorization of access to capabilities of applications accessible to users of the managed network devices according to roles assigned to the users; receive advertised capabilities from a new application accessible to the users; receive a request for authorization to one of the capabilities of the new application from one of the users; determine one of the roles assigned to the one of the users; determine whether the intent grants authorization to the one of the capabilities according to the one of the roles; and grant the one of the users access to the one of the capabilities when the intent grants authorization to the one of the capabilities according to the one of the roles.

13 Claims, 2 Drawing Sheets

(56) References Cited

U.S. PATENT DOCUMENTS

| | | | |
|---|---|---|---|
| 2022/0005558 A1* | 1/2022 | Malfait | G06F 16/2246 |
| 2022/0012045 A1* | 1/2022 | Rudraraju | G06Q 30/02 |
| 2022/0156164 A1* | 5/2022 | Gunjikar | G06F 11/2056 |
| 2022/0322090 A1* | 10/2022 | Gorai | H04W 12/0433 |

OTHER PUBLICATIONS

"Recommended Labels", kubernetes [online]. Retrieved from the Internet: <https://kubernetes.io/docs/concepts/overview/working-with-objects/common-labels/> Last Modified May 6, 2021. 1 pp.

Haider, "9 Best Practices and Examples for Working with Kubernetes Labels", replex [online]. Retrieved from the Internet: <https://www.replex.io/blog/9-best-practices-and-examples-for-working-with-kubernetes-labels> Sep. 28, 2018, 15 pp.

Wouters, "Accidentally deleted a Kubernetes service? Helm Rollback to the Rescue" KUORI [online]. Retrieved from the Internet: <https://www.kuori.io/post/accidentally-deleted-a-kubernetes-service-helm-rollback-to-the-rescue> Jul. 17, 2019, 5 pp.

Cade, "6 Best Practices for Kubernetes Backup", Kasten K10 Blog [online]. Retrieved from the Internet: <https://blog.kasten.io/6-best-practices-for-kubernetes-backup> Jun. 2019, 5 pp.

"Labels and Selectors", kubernetes [online]. Retrieved from the Internet: <https://kubernetes.io/docs/concepts/overview/working-with-objects/labels/> Last Modified Jul. 1, 2021. 5 pp.

* cited by examiner

INTENT-BASED USER AUTHENTICATION FOR DYNAMIC APPLICATIONS

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for granting or denying access to capabilities of an application to a user based on a role for the user. In particular, the authorization techniques include dynamic configuration of authorization information to capabilities of applications. That is, these techniques allow for authorization information to be defined dynamically, e.g., using intents. Thus, applications can be added and/or removed and authorization information for accessing capabilities of the applications can be rapidly deployed, rather than stored statically in a central location.

In one example, a method includes processing an intent for configuration of a plurality of managed network devices, the intent representing authorization of access to capabilities of applications accessible to users of the managed network devices according to roles assigned to the users; receiving advertised capabilities from a new application accessible to the users; receiving a request for authorization to one of the capabilities of the new application from one of the users; determining one of the roles assigned to the one of the users; determining whether the intent grants authorization to the one of the capabilities according to the one of the roles; and granting the one of the users access to the one of the capabilities when the intent grants authorization to the one of the capabilities according to the one of the roles.

In another example, a computing system includes one or more processing units implemented in circuitry and configured to: process an intent for configuration of a plurality of managed network devices, the intent representing authorization of access to capabilities of applications accessible to users of the managed network devices according to roles assigned to the users; receive advertised capabilities from a new application accessible to the users; receive a request for authorization to one of the capabilities of the new application from one of the users; determine one of the roles assigned to the one of the users; determine whether the intent grants authorization to the one of the capabilities according to the one of the roles; and grant the one of the users access to the one of the capabilities when the intent grants authorization to the one of the capabilities according to the one of the roles.

In another example, computer-readable storage medium having stored thereon instructions that, when executed, cause one or more processors to process an intent for configuration of a plurality of managed network devices, the intent representing authorization of access to capabilities of applications accessible to users of the managed network devices according to roles assigned to the users; receive advertised capabilities from a new application accessible to the users; receive a request for authorization to one of the capabilities of the new application from one of the users; determine one of the roles assigned to the one of the users; determine whether the intent grants authorization to the one of the capabilities according to the one of the roles; and grant the one of the users access to the one of the capabilities when the intent grants authorization to the one of the capabilities according to the one of the roles.

The details of one or more examples are set forth in the accompanying drawings and the description below. Other features, objects, and advantages will be apparent from the description and drawings, and from the claims.

DETAILED DESCRIPTION

Figure 1:
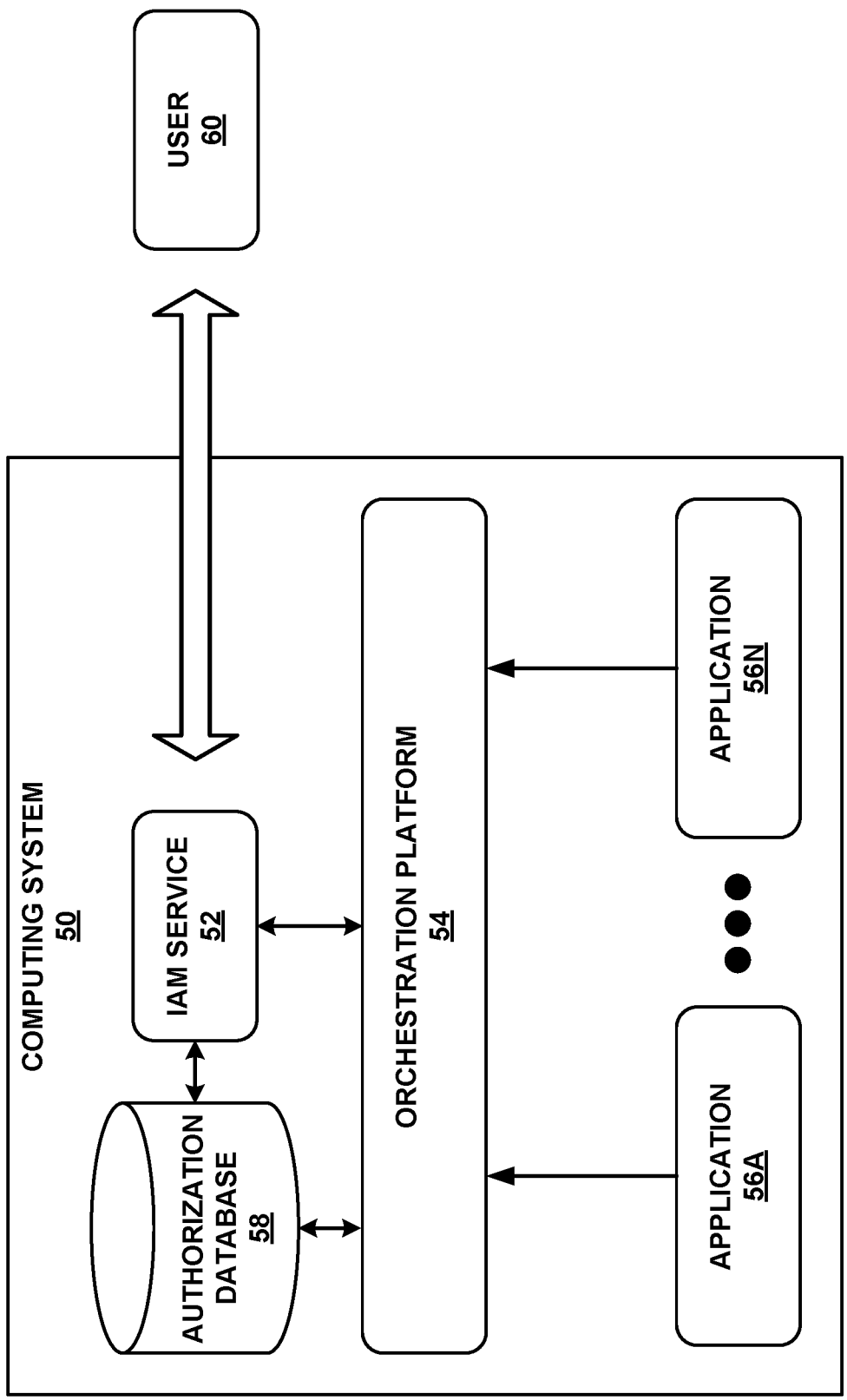
FIG. 1 is a conceptual diagram illustrating an example system for determining whether users are authorized to access capabilities of an application according to the techniques of this disclosure.

FIG. 1 is a conceptual diagram illustrating an example computing system 50 configured to determine whether users are authorized to access capabilities of an application according to the techniques of this disclosure. Computing system 50 may correspond to controller device 10 of FIGS. 1 and 2, may be configured to perform the functionality of controller device 10, or may be provided separately from controller device 10. In this example, computing system 50 includes an IAM service 52 (e.g., an IAM microservice) including custom resource definitions, orchestration platform 54, various applications 56A-56N (applications 56) each having various capabilities, and authorization database 58.

IAM service 52 may include one or more operators to receive capabilities information from applications 56. IAM service 52 may also maintain data for intents in authorization database 58 that represent authorization for user 60, e.g., according to a role for the user. An IAM microservice operator may act as an application-specific controller that is configured to create, configure, and manage the intent capabilities on behalf of IAM service 52 itself Orchestration platform 54 may be, for example, a container orchestration platform such as Kubernetes. Kubernetes is a container orchestration platform for automating, scaling, and managing containerized applications. A custom resource can be used to extend a Kubernetes platform by allowing a user to define an application program interface (API) that may not be available in a default installation of the Kubernetes platform. A custom resource is an object that includes data and/or methods that describe the custom resource and defines an API for creating and manipulating the data.

An authentication service (not shown in FIG. 1) may install a custom resource definition with "CapabilityMapping" in orchestration platform 54, and a consumer service can create resources using this definition. Creation of an instance of a custom resource 22 defined in authorization database 58 can begin with an API server (not shown) receiving a request to create a custom resource. As noted above, in some aspects, a custom controller can control provisioning and management of custom resources in Kubernetes. The CapabilityMapping data may be deployed in orchestration platform 54 by respective applications 56 when authorization is needed, and IAM service 52 may allow authorization based on these capabilities. The CapabilityMapping data may be stored in authorization database 58, for example. Examples of defining custom resources of a container orchestration platform are described in more detail in U.S. patent application Ser. No. 17/491,224, filed Sep. 30, 2021, the entire contents of which are incorporated herein by reference.

In particular, IAM service 52 may associate users, such as user 60, with respective roles. IAM service 52 may also process intents that associate such roles with sets of capabilities provided by applications such as applications 56. Thus, when user 60 requests access to a capability of one of applications 56, IAM service 52 may determine whether user 60 is authorized to access the capability based on the role of user 60. Moreover, when a new one of applications 56 is installed, the new one of applications 56 may provide capabilities to IAM service 52 via use orchestration platform 54. Thus, IAM service 52 need not receive a new intent with new authorization information representing the capabilities of the new one of applications 56. Instead, IAM service 52 may simply determine whether the role of user 60 is authorized to access various capabilities of the new one of applications 56 and grant or deny access to a particular one of the capabilities according to a previously received intent.

As an example, when user 60 requests access to a capability of one of applications 56 (whether previously installed or newly installed), IAM service 52 may determine a role assigned to user 60. IAM service 52 may then query authorization database 58 via orchestration platform 54 to determine whether the CapabilityMapping data stored in authorization database 58 grants the role for user 60 access to the requested capability. When the CapabilityMapping data grants the role access to the requested capability, IAM service 52 may grant user 60 access to the requested capability of the application, whereas when the CapabilityMapping data does not grant the role access to the requested capability, IAM service 52 may deny user 60 access to the requested capability of the application.

The following pseudocode depicts an example of defining capability mappings by a respective application service:
apiVersion: rbac.juniper.net/v1
kind: CapabilityMapping
metadata:
name: users
spec:
scopes:
-SP
-OpCo
-Tenant
mappings:
-name: Users:C
capabilities:
-service: iam.IamRPCService
methods:
-CreateUser
-name: Users:D
capabilities:
-service: iam.IamRPCService methods:
-DeleteUser
-name: Users:R
capabilities:
-service: iam.IamService
methods:
-GetUserView
-ListUserView
-name: Users:U
capabilities:
-service: iam.IamRPCService
methods:
-EditUser In this manner, computing system 50 represents an example of a computing system including one or more processors implemented in circuitry and configured to process an intent for configuration of a plurality of managed network devices, the intent representing authorization of access to capabilities of applications accessible to users of the managed network devices according to roles assigned to the users; receive advertised capabilities from a new application accessible to the users; receive a request for authorization to one of the capabilities of the new application from one of the users; determine one of the roles assigned to the one of the users; determine whether the intent grants authorization to the one of the capabilities according to the one of the roles; and grant the one of the users access to the one of the capabilities when the intent grants authorization to the one of the capabilities according to the one of the roles.

In the example shown in FIG. 1, the orchestration platform 54 is shown as being part of computing system 50. For example, orchestration platform 54 may be implemented in a datacenter (e.g., a public, private, or enterprise data center) or may be local to an enterprise. In other examples, platform 54 may be separate from computing system 50. In some aspects, some or all of the components of orchestration platform 54 may be implemented in a cloud computing environment. For example, some or all of applications 56A-56N may be implemented on servers in a cloud computing environment.

Figure 2:
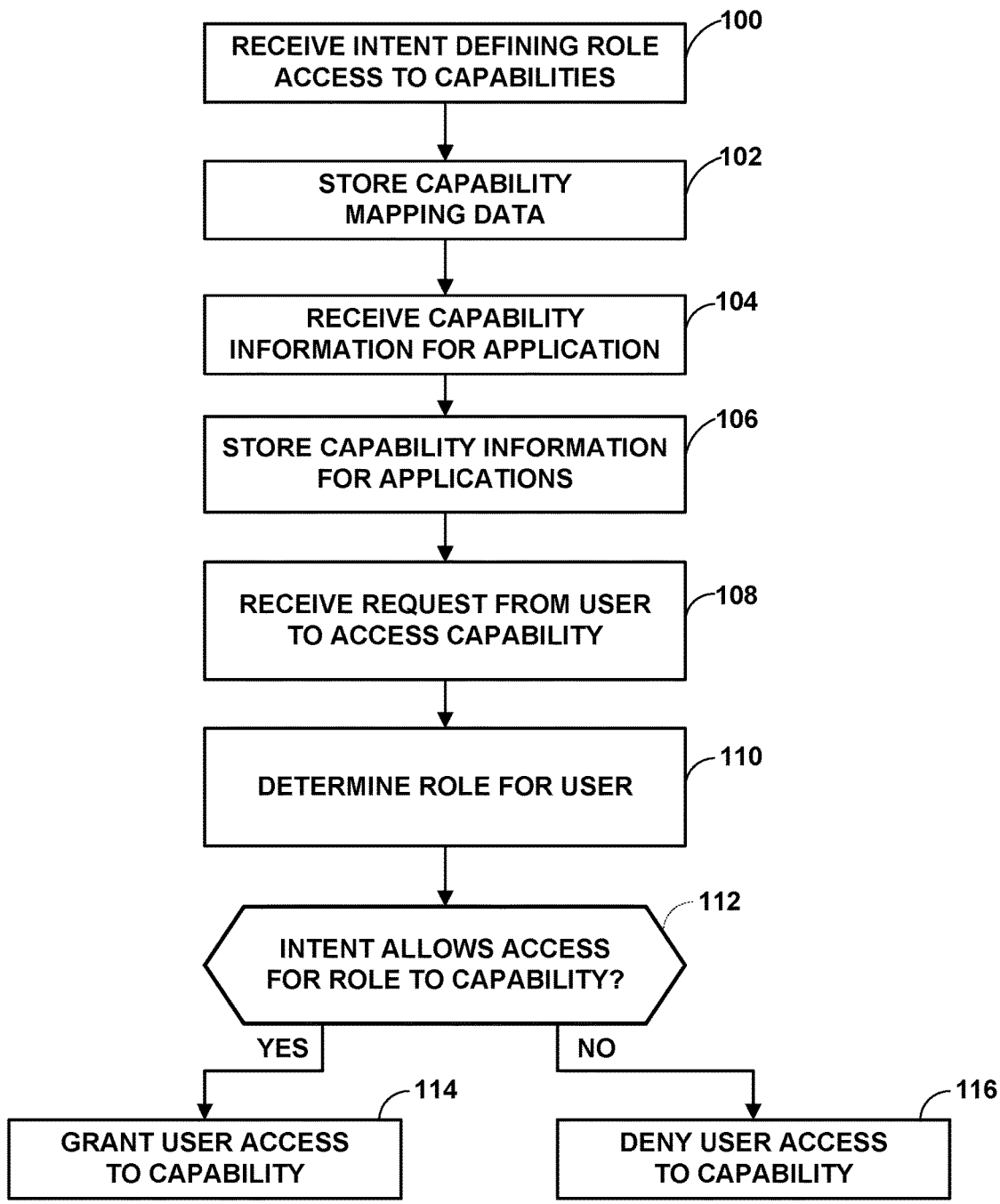
FIG. 2 is a flowchart illustrating an example method of managing access to capabilities of applications by users according to roles for the users in accordance with the techniques of this disclosure.

FIG. 2 is a flowchart illustrating an example method of managing access to capabilities of applications by users according to roles for the users in accordance with the techniques of this disclosure. The method of FIG. 2 is explained with respect to the example computing system 50 of FIG. 1. However, in other examples, other systems or devices, such as controller device 10 of FIGS. 1 and 2, may be configured to perform the method of FIG. 2.

In this example, computing system 50 receives an intent defining role access to capabilities (100). That is, the intent may define user roles and corresponding capabilities of applications 56 to which those roles are permitted or denied access. IAM service 52 of computing system 50 may store capability mapping data representing the intent to authorization database 58 (102). That is, IAM service 52 may store data representing capabilities of applications 56 to which the roles are granted or denied access. IAM service 52 may receive multiple such intents, and store data for each of the intents to authorization database 58. Furthermore, certain newly received intents may revise authorization information for various roles, create new roles, delete roles, create new capabilities, delete capabilities, modify authorization information for roles and/or capabilities, or the like, in which case IAM service 52 may update authorization database 58 according to the newly received intent(s).

IAM service 52 may further receive, via orchestration platform 54, capability information for a new one of applications 56 (104). That is, when the new one of applications 56 is installed, the new one of applications 56 (or another proxy service or application) may publish capabilities provided by the new one of applications 56 to orchestration platform 54, which may forward the capabilities information to IAM service 52. IAM service 52 or orchestration platform 54 may store the capabilities information in authorization database 58 as well (106). Thus, authorization database 58 may include data representing: 1) users and corresponding roles, 2) roles that are permitted access to certain application capabilities, 3) roles that are denied access to certain application capabilities, and 4) capabilities for each of applications 56.

IAM service 52 may then receive an authorization request from, e.g., user 60 (or one of elements 14 operated by user 60) to access a capability of one of applications 56 (108). IAM service 52 may then determine a role for user 60 (110) and then determine whether one or more intents allow access for the determined role to the requested capability (112). In the case that the intents allow access for the role to the capability ("YES" branch of 112), IAM service 52 may grant user 60 access to the requested capability (114). However, in the case that the intents do not allow access for the role to the capability ("NO" branch of 112), IAM service 52 may deny user 60 access to the capability (116).

In this manner, the method of FIG. 2 represents an example of a method including processing an intent for configuration of a plurality of managed network devices, the intent representing authorization of access to capabilities of applications accessible to users of the managed network devices according to roles assigned to the users; receiving advertised capabilities from a new application accessible to the users; receiving a request for authorization to one of the capabilities of the new application from one of the users; determining one of the roles assigned to the one of the users; determining whether the intent grants authorization to the one of the capabilities according to the one of the roles; and granting the one of the users access to the one of the capabilities when the intent grants authorization to the one of the capabilities according to the one of the roles.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
   processing an intent for configuration of a plurality of managed network devices, the intent representing authorization of access to capabilities of applications accessible to users of the managed network devices according to roles assigned to the users;
   receiving advertised capabilities from a new application accessible to the users;
   receiving a request for authorization to one of the capabilities of the new application from one of the users;
   determining one of the roles assigned to the one of the users;
   determining whether the intent grants authorization to the one of the capabilities according to the one of the roles; and
   granting the one of the users access to the one of the capabilities when the intent grants authorization to the one of the capabilities according to the one of the roles.

2. The method of claim 1, wherein receiving the advertised capabilities from the new application comprises receiving the advertised capabilities via an orchestration platform.

3. The method of claim 1, further comprising installing a capability mapping resource definition in an orchestration platform to store data representing the advertised capabilities from the new application.

4. The method of claim 3, wherein determining whether the intent grants the authorization to the one of the capabilities comprises retrieving the advertised capabilities for the new application from the capability mapping resource definition.

5. A computing system comprising one or more processors implemented in circuitry and configured to:
   process an intent for configuration of a plurality of managed network devices, the intent representing authorization of access to capabilities of applications accessible to users of the managed network devices according to roles assigned to the users;
   receive advertised capabilities from a new application accessible to the users;
   receive a request for authorization to one of the capabilities of the new application from one of the users;
   determine one of the roles assigned to the one of the users;
   determine whether the intent grants authorization to the one of the capabilities according to the one of the roles; and
   grant the one of the users access to the one of the capabilities when the intent grants authorization to the one of the capabilities according to the one of the roles.

6. The computing system of claim 5, wherein the one or more processors are configured to execute an orchestration platform, and wherein to receive the advertised capabilities from the new application, the one or more processors are configured to receive the advertised capabilities via the orchestration platform.

7. The computing system of claim 5, wherein the one or more processors are further configured to install a capability mapping resource definition in an orchestration platform to store data representing the advertised capabilities from the new application.

8. The computing system of claim 7, wherein to determine whether the intent grants the authorization to the one of the capabilities, the one or more processors are configured to retrieve the advertised capabilities for the new application from the capability mapping resource definition.

9. The computing system of claim 5, further comprising a memory configured to store data for the intent and the roles assigned to the users.

10. A computer-readable storage medium having stored thereon instructions that, when executed, cause one or more processors to:
    process an intent for configuration of a plurality of managed network devices, the intent representing authorization of access to capabilities of applications accessible to users of the managed network devices according to roles assigned to the users;
    receive advertised capabilities from a new application accessible to the users;
    receive a request for authorization to one of the capabilities of the new application from one of the users;
    determine one of the roles assigned to the one of the users;
    determine whether the intent grants authorization to the one of the capabilities according to the one of the roles; and
    grant the one of the users access to the one of the capabilities when the intent grants authorization to the one of the capabilities according to the one of the roles.

11. The computer-readable storage medium of claim 10, wherein the instructions that cause the one or more processors to receive the advertised capabilities from the new application comprise instructions that cause the one or more processors to receive the advertised capabilities via an orchestration platform.

12. The computer-readable storage medium of claim 10, further comprising instructions that cause the one or more processors to install a capability mapping resource definition in an orchestration platform to store data representing the advertised capabilities from the new application.

13. The computer-readable storage medium of claim 12, wherein the instructions that cause the one or more processors to determine whether the intent grants the authorization to the one of the capabilities comprise instructions that cause the one or more processors to retrieve the advertised capabilities for the new application from the capability mapping resource definition.

* * * * *